US009873445B2

(12) United States Patent  
Davison

(10) Patent No.: US 9,873,445 B2  
(45) Date of Patent: Jan. 23, 2018

(54) VEHICLE TRANSPORTATION, STORAGE, AND MAINTENANCE ASSEMBLIES AND METHODS

(71) Applicant: Tim Davison, Deer Park, WA (US)

(72) Inventor: Tim Davison, Deer Park, WA (US)

( * ) Notice: Subject to any disclaimer, the term of this patent is extended or adjusted under 35 U.S.C. 154(b) by 0 days.

(21) Appl. No.: 15/244,280

(22) Filed: Aug. 23, 2016

(65) Prior Publication Data

US 2016/0362125 A1    Dec. 15, 2016

Related U.S. Application Data

(63) Continuation of application No. 12/307,912, filed as application No. PCT/US2007/015510 on Jul. 6, 2007, now Pat. No. 9,428,156.

(60) Provisional application No. 60/819,044, filed on Jul. 7, 2006.

(51) Int. Cl.
| | |
|---|---|
| *B62B 3/02* | (2006.01) |
| *B60P 3/07* | (2006.01) |
| *B60S 13/00* | (2006.01) |
| *B62B 3/10* | (2006.01) |
| *B60S 13/02* | (2006.01) |

(52) U.S. Cl.
CPC ................ *B62B 3/02* (2013.01); *B60P 3/07* (2013.01); *B60S 13/00* (2013.01); *B60S 13/02* (2013.01); *B62B 3/10* (2013.01); *B62B 2202/90* (2013.01); *B62B 2203/05* (2013.01); *B62B 2203/74* (2013.01)

(58) Field of Classification Search
CPC .............. B62B 1/002; B62B 3/04; B62B 3/10
See application file for complete search history.

(56) References Cited

U.S. PATENT DOCUMENTS

| 1,358,235 | A | 11/1920 | Nylin |
| 1,501,609 | A | 7/1924 | Linden |
| 2,846,233 | A | 8/1958 | Burg |
| 3,873,118 | A | 3/1975 | Takagi |
| 6,273,438 | B1 | 8/2001 | Prapavat |
| 6,530,583 | B1 | 3/2003 | Mueller |
| 6,857,836 | B2 | 2/2005 | Keller |
| 7,350,790 | B1 * | 4/2008 | Wilson ................. B60D 1/00 |
| | | | 280/402 |
| 2003/0173752 | A1 | 9/2003 | Veeser |
| 2004/0032104 | A1 | 2/2004 | Savage |
| 2006/0071450 | A1 * | 4/2006 | Wu ........................ B25H 1/04 |
| | | | 280/642 |

FOREIGN PATENT DOCUMENTS

| WO | WO PCT/US2007/015510 | 8/2008 |
| WO | WO PCT/US2007/015510 | 1/2009 |

\* cited by examiner

*Primary Examiner* — Katy M Ebner  
(74) *Attorney, Agent, or Firm* — Wells St. John P.S.

(57) ABSTRACT

The present disclosure provides vehicle transportation and storage assemblies that can include a moving frame coupled to a loading frame and a support frame extending at an angle other than normal from the moving frame to the loading frame. Vehicle moving, storage, and/or maintenance methods are provided that can include supporting a vehicle with an assembly in a first position, with the first position supporting the vehicle substantially parallel to the road surface, and pivoting the assembly to support the vehicle in a second position, the second position supporting the vehicle substantially normal to the road surface.

9 Claims, 16 Drawing Sheets

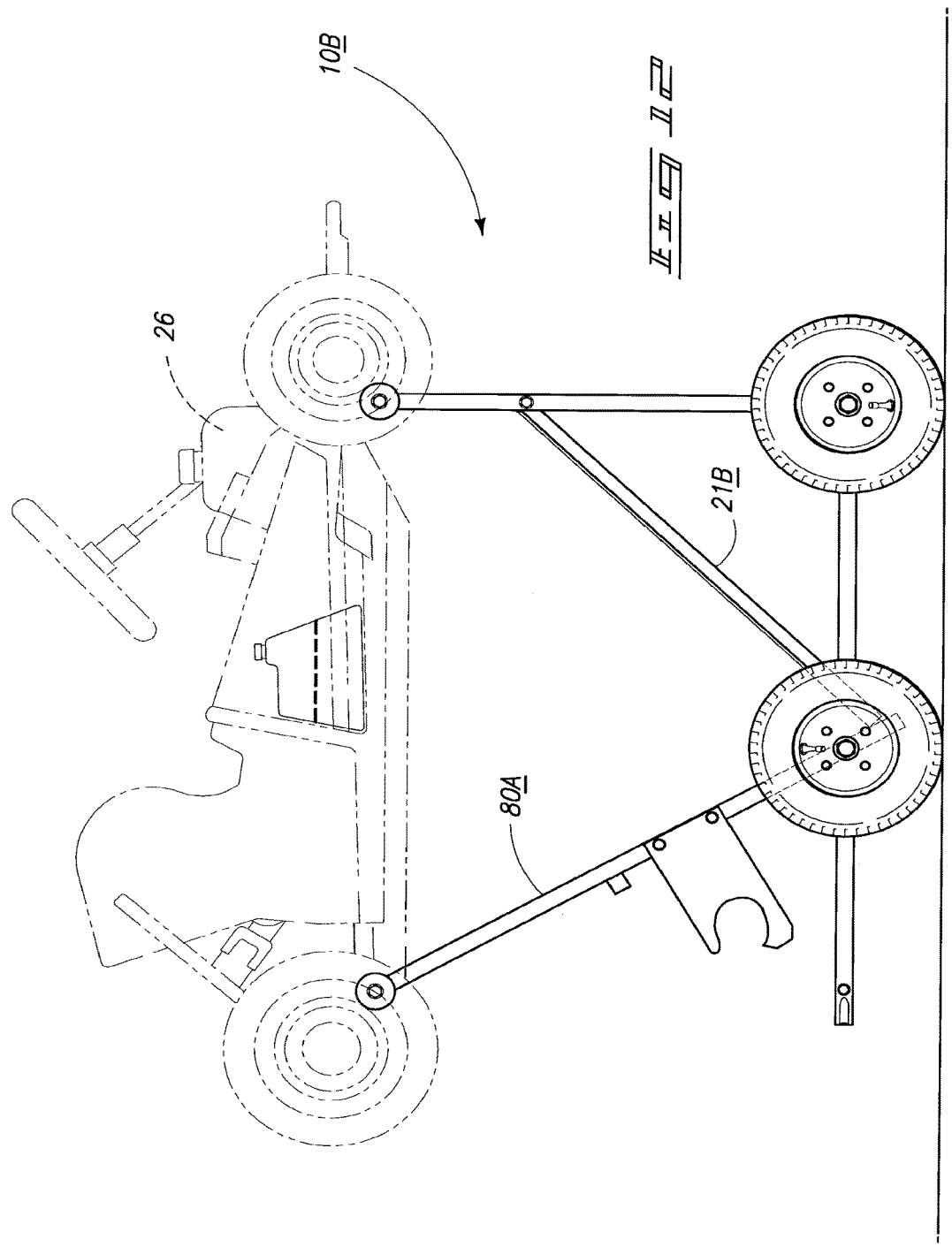

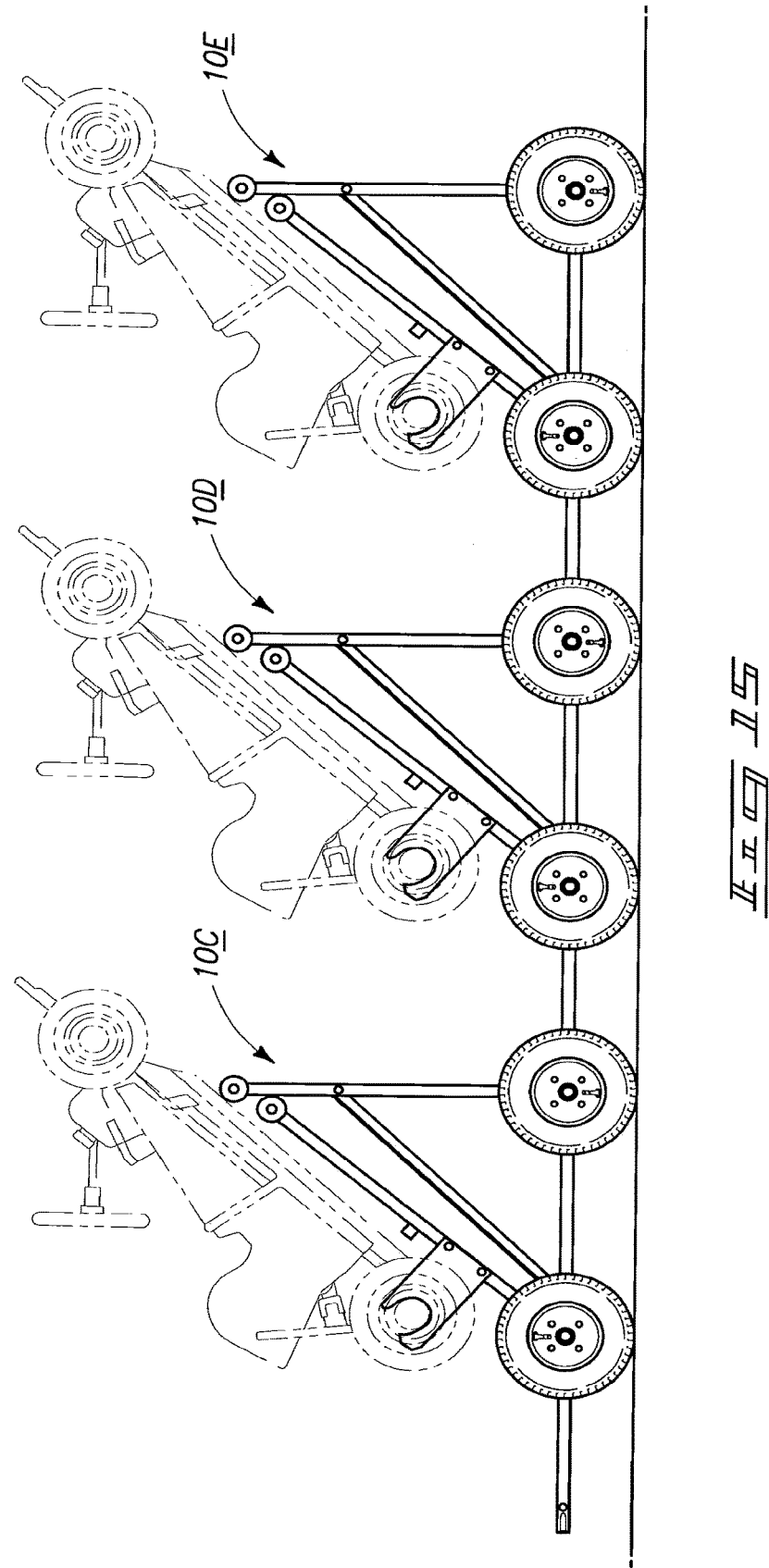

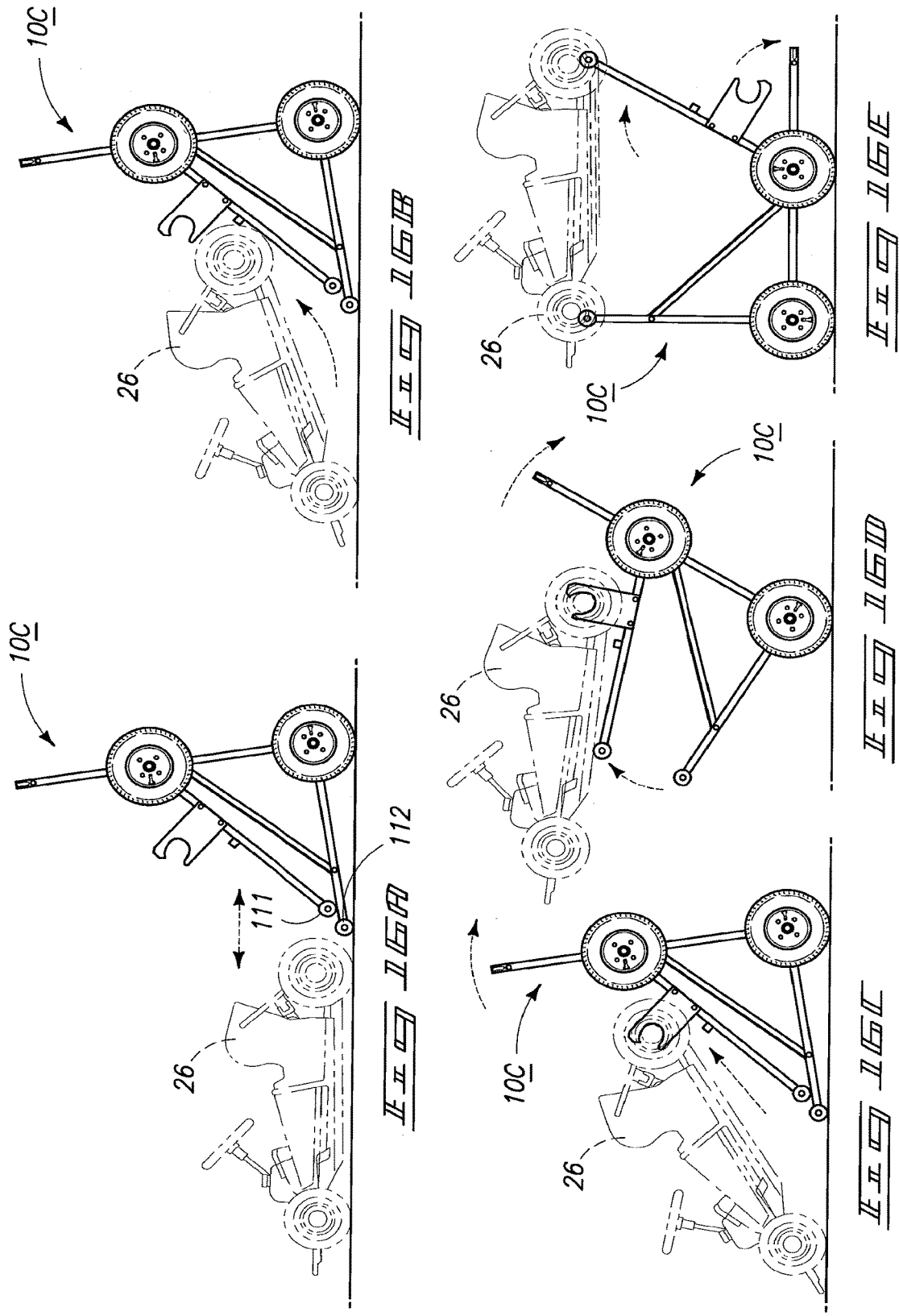

VEHICLE TRANSPORTATION, STORAGE, AND MAINTENANCE ASSEMBLIES AND METHODS

RELATED PATENT DATA

This application is a continuation of U.S. patent application Ser. No. 12/307,912 which was filed 7 Jan. 2009, which is a 35 U.S.C. §371 of and claims priority to PCT International Application Number PCT/US2007/015510, which was filed 6 Jul. 2007 (06.07.2007) and was published in English, which claims priority under 35 U.S.C. §119 to U.S. Provisional Patent Application No. 60/819,044 entitled "Vehicle Transportation, Storage, and Maintenance Assemblies and Methods" which was filed 7 Jul. 2006 (07.07.2006) the entirety of each are incorporated herein by reference.

TECHNICAL FIELD

The present disclosure relates to vehicle transportation and storage assemblies as well as vehicle moving, storage, and/or maintenance methods.

BACKGROUND OF THE DISCLOSURE

Vehicles including multi-wheeled vehicles, such as bi-wheeled, tri-wheeled and even four wheeled vehicles can be transported using larger vehicles, stored within indoor facilities, and/or require maintenance and/or modification. For example, larger vehicles such as trucks can be utilized to transport vehicles such as go-karts between an indoor facility such as a garage and go-kart racing track. Transportation of these vehicles can be difficult, in that typical trucks and/or transportation vehicles do not have the cargo space necessary to transport the vehicle itself, as well as all the additional vehicle supplies and/or accessories. For example, a full size long bed pickup truck typically only has room for one go-kart in the bed. When considering the wheel wells of the bed, loading and unloading the go-kart can prove to be difficult. These are just some of the problems associated with transporting these and other vehicles. The present disclosure provides assemblies and methods that can be utilized to not only transport these vehicles, but also store and support these vehicles for maintenance, repair and/or modification.

SUMMARY OF THE DISCLOSURE

Vehicle transportation and storage assemblies are provided that can include a moving frame coupled to a loading frame and a support frame extending at an angle other than normal from the moving frame to the loading frame.

Vehicle moving, storage, and/or maintenance methods are provided that can include supporting a vehicle with an assembly in a first position, with the first position supporting the vehicle substantially parallel to the road surface, and pivoting the assembly to support the vehicle in a second position, the second position supporting the vehicle substantially normal to the road surface.

BRIEF DESCRIPTION OF THE DRAWINGS

Embodiments of the disclosure are described below with reference to the following accompanying drawings.

FIG. 12 is the assembly of FIG. 9, and a vehicle according to an embodiment.
FIG. 13 is a detail of the assembly of FIG. 9 according to an embodiment.
FIG. 15 is an assembly according to an embodiment.
FIGS. 16A-16E are assemblies and vehicles according to embodiments.

DESCRIPTION

Figure 1:
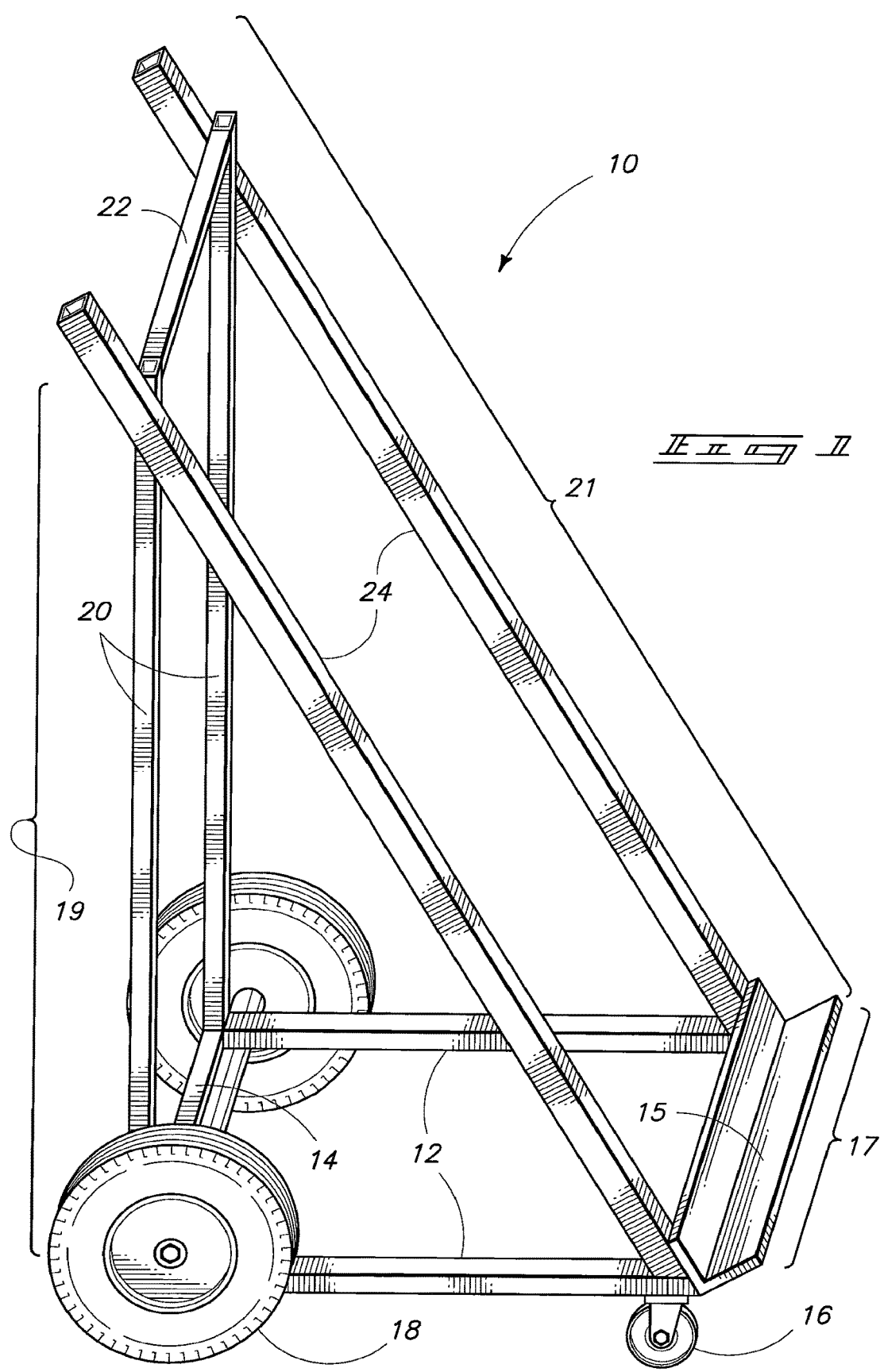
FIG. 1 is an assembly according to an embodiment.

The disclosure will be described with reference to the above described figures, particularly, FIGS. 1-16. Referring to FIG. 1, an assembly 10 is depicted according to an exemplary embodiment that includes members 12 and cross members 14 and 15 that are comprised by moving frame 17. Members 12 and cross members 14 and 15 can be constructed of tubular steel, for example. The gauge steel can be chosen taking into consideration the type of vehicle to be transported, stored, and/or maintained. According to an exemplary embodiment, members 12, 14, and/or 15 may be constructed of aluminum, plastic composite, and/or 0.65-0.75 gauge steel to support a vehicle such as a go-kart, dirt kart, dirt cars, mini car, and/or midget cars.

To form frame 17, members 12 can be aligned substantially parallel to one another with members 14 and 15 extending there between. According to exemplary embodiments members 12, 14, and 15 can be aligned in the substantially square and/or rectangular orientation. Members 12 and cross members 14 and 15 can be coupled to one another utilizing coupling mechanisms or apparatuses known to those of ordinary skill in the art. For example, members 12 and members 14 and 15 can be coupled to one another utilizing welding and/or fasteners. According to an exemplary implementation, members of tubular steel can be welded to one another or bolted and/or fastened to one another. End portions of cross members 14 and 15 can be coupled to members 12, for example. Frame 17 can be of a length defined by members 12 and a width defined by members 14 and 15 that is sufficient to provide a supportive base for a vehicle to be transported. According to exemplary embodiments, frame 17 may be of width less than the distance between the wheel wells of a transport vehicle such as a truck bed or a trailer. According to exemplary embodiments the distance between wheel wells can be dependant upon the vehicle utilized to transport the vehicle. For example, the distance between wheel wells of a full size pickup is larger than that of mid-sized or even mini-trucks. The width of assembly 10 can be designed accordingly to allow for transport within any or all of these transport vehicles while providing sufficient support for the vehicle to be transported. Exemplary widths include widths of 48, 64, or even 72 inches.

Member 15 can also be configured as an apparatus to receive a portion of a vehicle, for example an axel or frame of a recreational vehicle. Member 15 can be referred to as a flange as it can extend from support frame 21. Member 15 can be a portion of frame 17 or it may be coupled to an upper portion of support frame 21. Member 15 can be coupled to support frame 21 at a portion of support frame 21 proximate moving frame 17. Member 15 can be constructed of L-bar steel for example and aligned with members 12 and 14 as shown to provide a ledge that can be used to support at least a portion of a vehicle to be transported, stored, and/or maintained using assembly 10. Member 15 can be configured to provide a stop when loading a vehicle onto assembly 10. Member 15 may be configured to receive attachment devices that may be used to couple a vehicle to moving frame 17.

Figure 2:
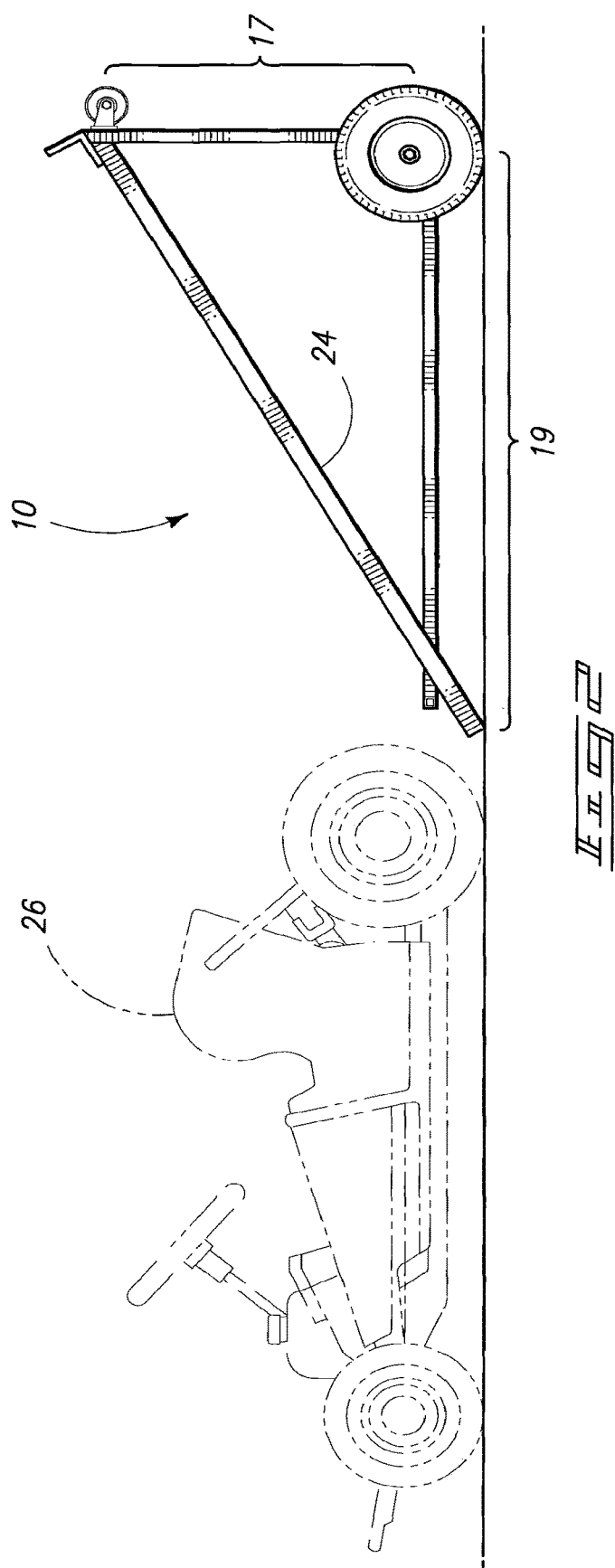
FIG. 2 is the assembly of FIG. 1, and a vehicle according to an embodiment.

Moving frame 17 may also be supported by wheels 16 and 18, for example. While not necessary, wheels 16 can take the form of castors and can be coupled to the lower portion of frame 17. Assembly 10 can be at least partially supported by a mobile apparatus such as wheels 16 and/or 18, for example. The mobile apparatus can be coupled to assembly 10 proximate the coupling of frame 19 and frame 17, for example. The mobile apparatus can be configured to provide for a pendular motion of assembly between a first position having loading frame 19 substantially parallel to a road surface (as shown in FIG. 2), and a second position having moving frame 17 substantially parallel to the road surface (as shown in FIG. 1).

According to exemplary embodiments, wheels. 16 can be of differing designs such as a lighter weight design to facilitate the loading configuration (described later), wherein wheels 16 may be extended in an upward position. Wheels 18 can take the form of tires joined to one another via an axle. The axle may or may not be utilized to form cross member 14. Wheels 18 and wheels 16 may be aligned so that moving frame 17 is substantially level in the storage and/or transport position depicted in FIG. 1.

Extending from moving frame 17 can be members 20 that are coupled to moving frame 17. Cross member 22 can extend between members 20. Members 20, cross member 14, as well as cross member 22 can comprise loading frame 19. Loading frame 19 can extend substantially perpendicularly from moving frame 17. According to exemplary embodiments, members 20 and 22 can likewise be constructed of tubular steel and coupled to moving frame 17 via welding and/or any other coupling mechanisms known to those of ordinary skill in the art. The length of cross member 22 can be substantially equivalent to the length of members 14 and 15. According to exemplary embodiments, frame 19 can be about the same width as frame 17. In exemplary embodiments, assembly 10 can be configured to support a four wheeled go-kart, and the width of cross members 22, 14, and 15 can be less that the width of the axles of the go-kart. As exemplarily depicted in FIG. 1, the lengths of members 20 defining the length of frame 19 can be substantially longer than the length of frame 17 defined by the length of members 12. In accordance with exemplary implementations, frame 19 can be about 50% longer than frame 17.

According to exemplary embodiments, members 24 can extend from moving frame 17 to loading frame 19 at an angle substantially other than normal. Members 24 can likewise be constructed of tubular steel and be affixed to frames 17 and 19 via arc welding, for example. Members 24, as well as, portions of frames 17 and 19 can be comprised by support frame 21. Members 24 can extend beyond loading frame 19 to an extent that when assembly 10 is in the loading position (see FIG. 2, for example), the portions of members 24 extending beyond frame 19 can support assembly 10 in a substantially level configuration. In an implementation support frame 21 can extend from the loading frame to form an additional support of the assembly when in the first position. As such, the extent to which members 24 extending beyond loading frame 19 can be approximately equivalent to the extent to which wheels 18 extend beyond loading frame 19, according to exemplary embodiments.

Assembly 10 can include moving frame 17 couple to loading frame 19 and support frame 21. Support frame 21 can extend at an angle other than normal from moving frame 17 to loading frame 19. A first end portion of moving frame 17 can be coupled to a first end portion of loading frame 19. Loading frame 19 can extend from the first end portion of moving frame 17 to a second end portion of loading frame 19. Support frame 21 can extend from the second end portion of loading frame 19 to a second end portion of moving frame 17. The second end portion of moving frame 17 can oppose or be opposite the first end portion of moving frame 17. Assembly 10 can be configured to have moving frame 17 coupled to loading frame 19 at the first end portion to form a substantially normal angle in one elevation. The second end portion of moving frame 17 and support frame 21 can be coupled to form an angle other than normal, for example. Further, the second end portion of loading frame 19 and support frame 21 can be coupled to form an angle other than normal.

Referring to FIG. 2, assembly 10 is shown in its loading position, wherein loading frame 19 is aligned substantially horizontally and moving frame 17 is aligned substantially vertical to the horizontal position of loading frame 19. An exemplary vehicle 26 is shown in a position ready to be loaded onto assembly 10. As shown according to the depicted embodiment of FIG. 2, the distance to which members 24 of support frame 21 extend beyond loading frame 19 is sufficient to align loading frame 19 in the horizontal position, while maintaining moving frame 17 in a substantially vertical position according to an exemplary embodiment.

Figure 3:
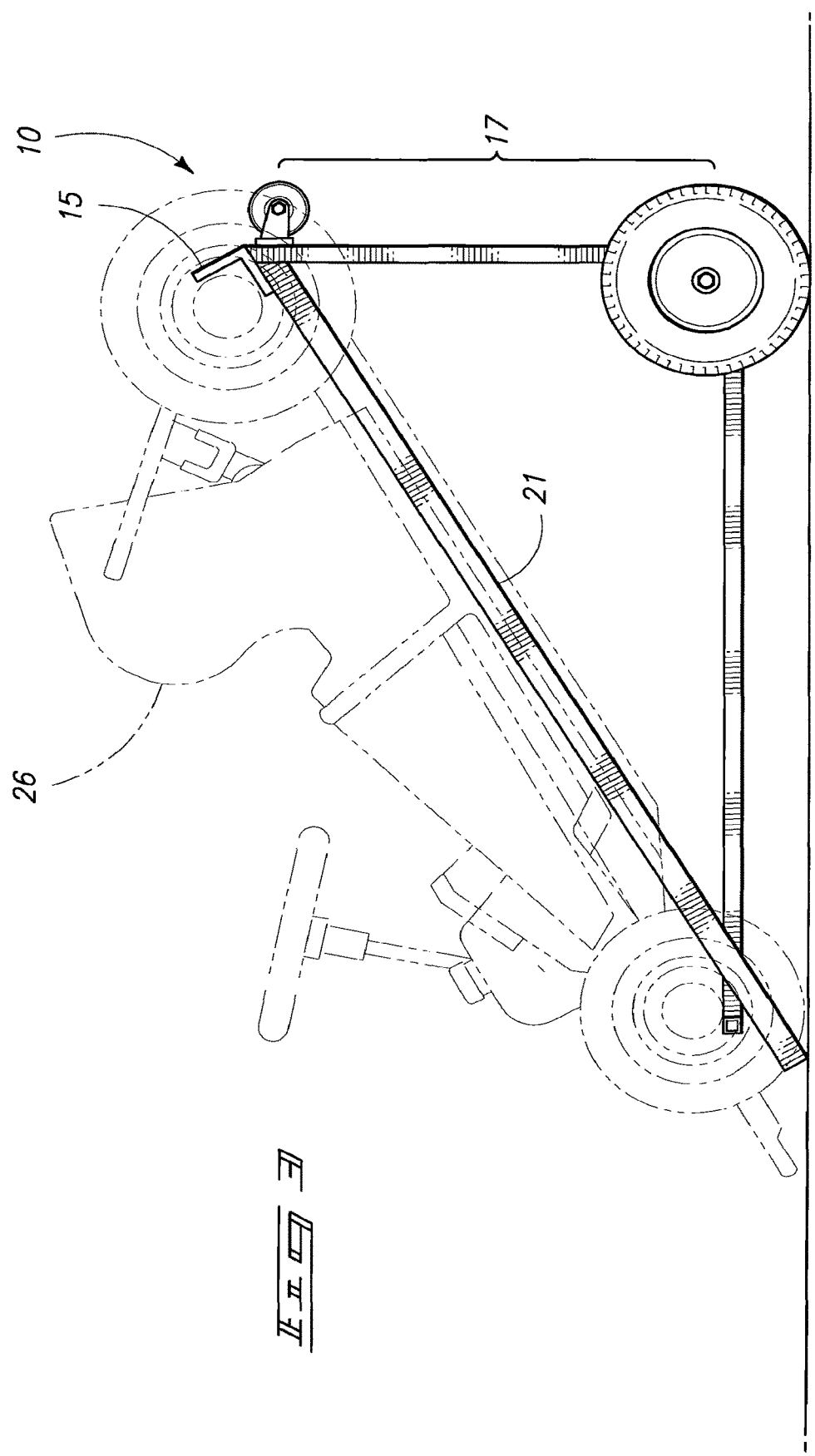
FIG. 3 is the assembly of FIG. 1, and a vehicle according to an embodiment.

Referring to FIG. 3, a partially loaded vehicle 26 is shown in a partially loaded position as it relates to assembly 10. According to exemplary embodiments, member 15 can be configured as stop to resist the further extension of vehicle 26 beyond moving frame 17. Frame 21 can include coupling apparatuses (not shown) which may be used to couple vehicle 26 to frame 21.

Figure 4:
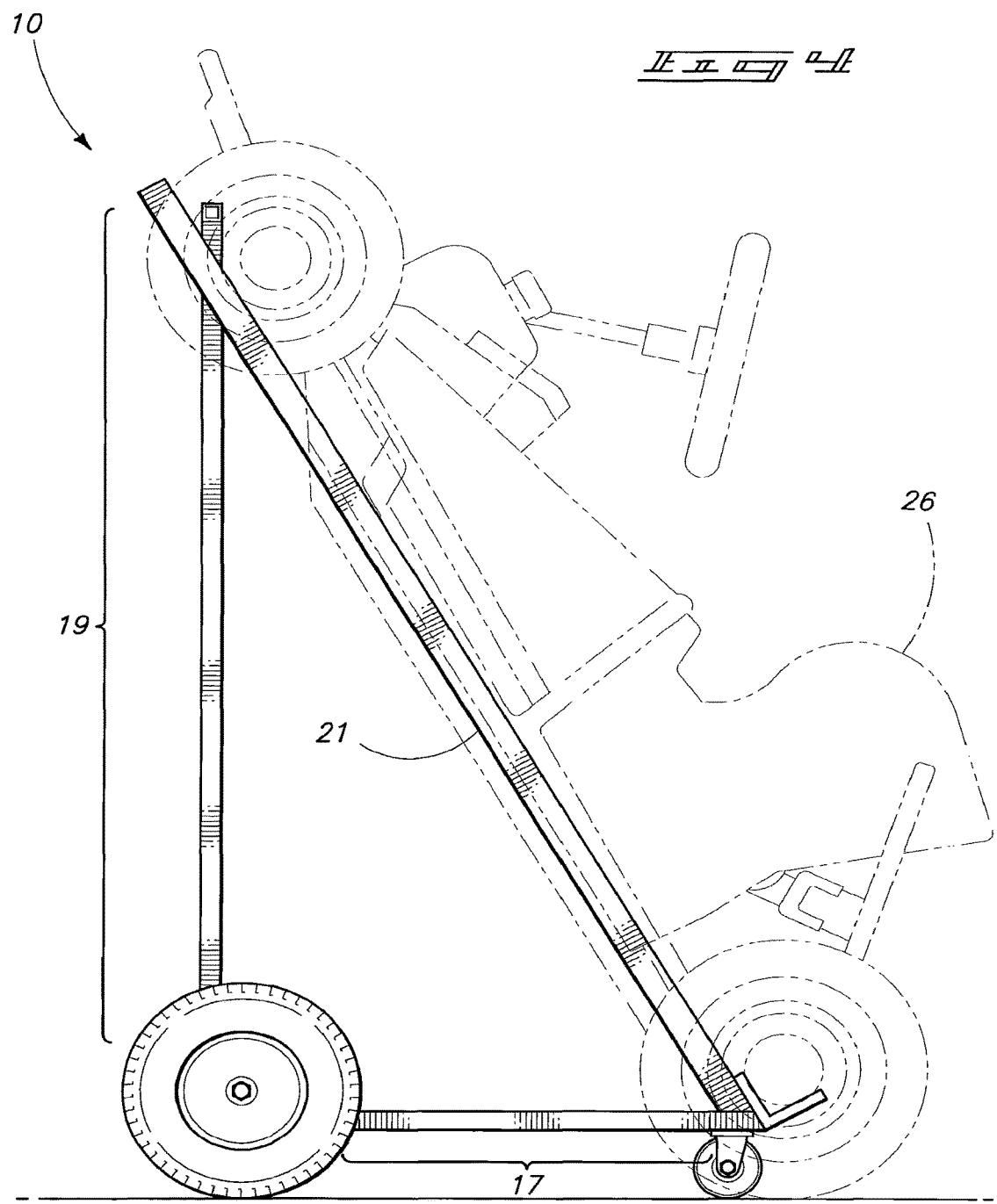
FIG. 4 is the assembly of FIG. 1, and a vehicle according to an embodiment.

Referring to FIG. 4, once loaded onto support frame 21, assembly 10 can be moved from loading position 1 to moving position 2, wherein in loading position 1, frame 19 is substantially horizontal and moving frame 17 is substantially vertical, and in loading position 2, loading frame 19 is substantially vertical, and moving frame 17 is substantially horizontal. According to exemplary embodiments, in the operation of moving assembly 10 from loading position 1 to moving position 2, vehicle 26 can be supported by frame 17 and wheels 18 and 16 for movement. According to exemplary embodiments, prior to positioning assembly 10 to the moving position, vehicle 26 can be fixed or coupled to support frame 21 and moved accordingly. In position 2, multiple assemblies may be used to store multiple karts. Multiple karts can be stored and/or transported utilizing assembly 10 by aligning the karts in a substantially vertical alignment rather than their typical horizontal alignment, for example. In an exemplary aspect, using assembly 10, multiple karts may be aligned in storage position 2. Storing karts using assembly 10 can utilize less storage space and allow for easier transportation. As another example, once supported by frame 17, vehicle 26 can be rolled into a typical transportation vehicle such as a truck bed. According to exemplary embodiments, members 14 and 15 of frame 17 can be configured to not extend beyond the typical width between wheel wells in the standard truck bed or known truck beds. This is also consistent with the distance between wheels 18 and 16. According to exemplary configurations, this can allow for the actual moving of vehicle 26 utilizing assembly 10 onto the bed of a utility truck without having to lift the kart over the wheel wells of the truck. Assembly 10 can also provide for the substantial vertical stacking of the karts in the bed of a truck. For example, where it has been the case that a truck bed could only transport one kart, according to exemplary embodiments, a truck bed could be utilized to transport at least two karts. The truck bed being utilized here can include and is not limited to semi-tractor trailers, trailers, as well as other transportation assemblies.

Figure 5:
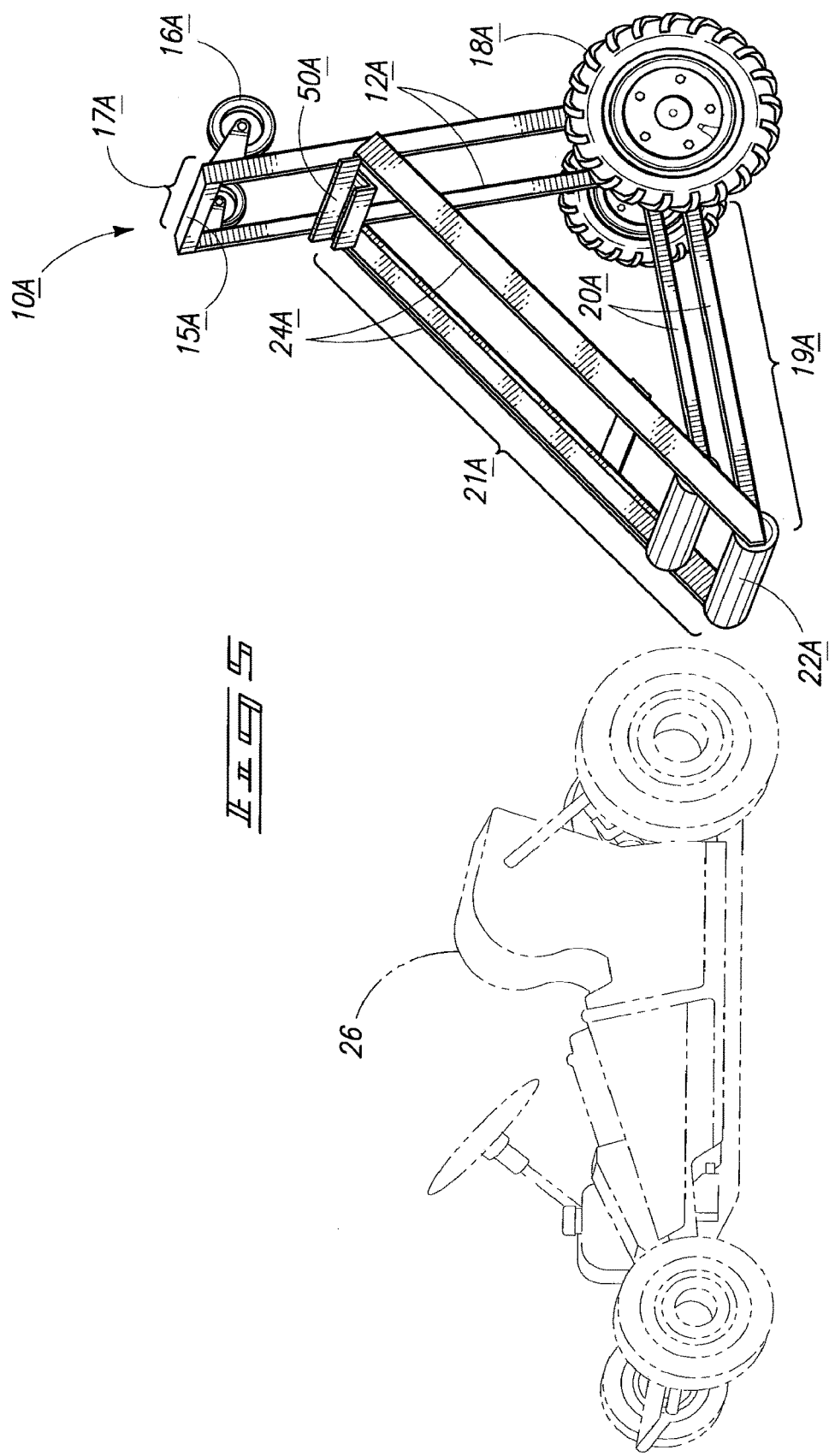
FIG. 5 is an assembly according to an embodiment.

Referring to FIG. 5, according to another exemplary embodiment, assembly 10A can be configured to include a moving frame 17A which is comprised of cross members 15A and 14 (not shown), as well as members 12A. According to exemplary embodiments, the moving frame 17A can also include wheels 16A and 18A. Assembly 10A can also include a loading frame 19A that is constructed of members 20A and cross member 22A, for example. According to exemplary embodiments, cross member 22A can be configured as a roller that allows for the transition of vehicle 26 onto support frame 21A. Support frame 21A can be comprised of members 24A as well as support or cross member 50A. According to exemplary embodiments, support frame 21A can be configured along with cross member 50A to receive vehicle 26 and then latch at least a portion of vehicle 26 to cross member 50A. In exemplary implementations, cross member 50A can be constructed as a stop and/or catch configuration, such as the stop can be aligned with an upper portion of moving frame 17A, and the catch portion can be, in certain exemplary implementations, a ledge or hook to receive at least a portion of vehicle 26, such as a frame portion of vehicle 26. According to exemplary embodiments, moving frame 17A of assembly 10A in the loading position can extend vertically beyond the extent of support frame 21. As an example, members 12A can extend beyond its coupling with members 24A. In exemplary embodiments, this can allow for a stable transition from loading position 1 to moving position 2. For example, a portion of the extension of frame 17A can be used as a handle to assist in the transition of assembly 10A between the loading and/or storage positions and/or to form additional support of the vehicle when in the second position.

Figure 6:
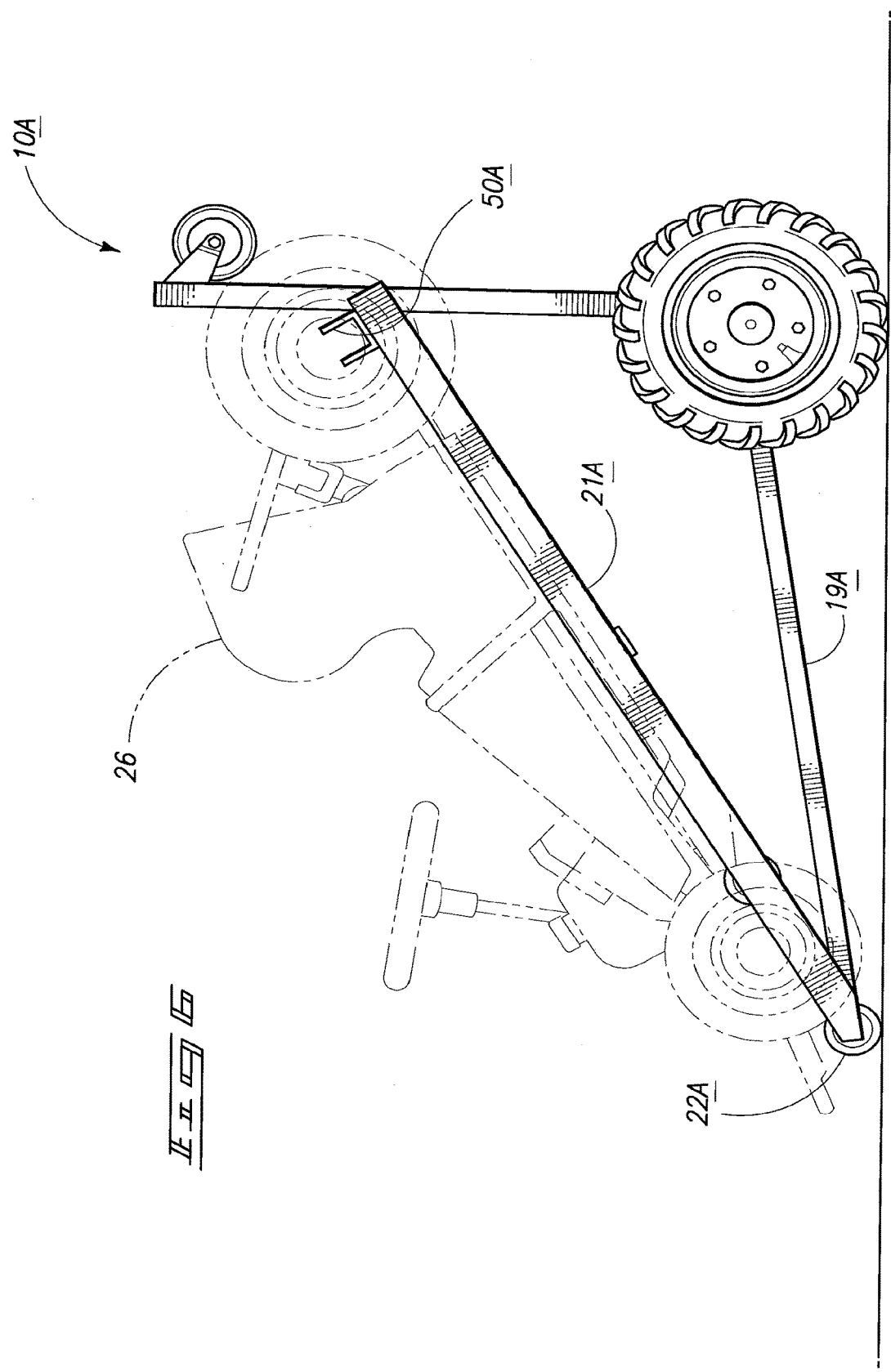
FIG. 6 is the assembly of FIG. 5, and a vehicle according to an embodiment.

Referring to FIG. 6, vehicle 26 is shown in a partially loaded position onto assembly 10A with assembly 10A in the loading position. According to exemplary embodiments, member 22A can be configured as a rolling member, and as a rolling member, it can be configured to align loading frame 19A of kart 10A in a substantially horizontal position, allowing for the receipt of vehicle 26 by support frame 21A. According to another implementation, rolling member 22A can be of a size that configures frame 19A as a ramp to receive vehicle 26. As is shown in the exemplary depiction, cross member 50A is configured to receive at least a portion of vehicle 26, such as a frame portion of vehicle 26.

Figure 7:
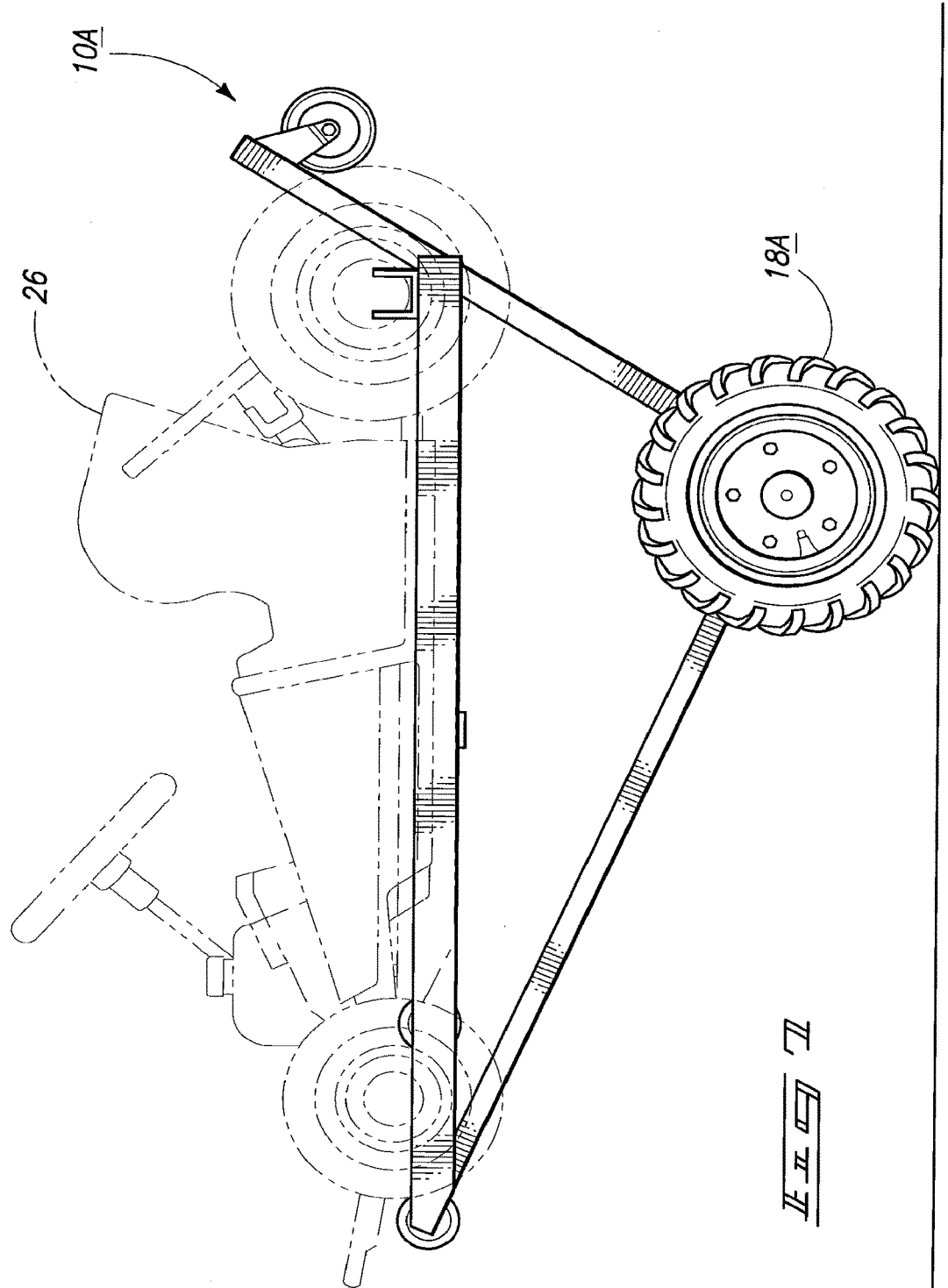
FIG. 7 is the assembly of FIG. 5, and a vehicle according to an embodiment.

As is shown in FIG. 7, assembly 10A is in what can be configured as at least one moving position, or as a transition position transforming between the loading and the storage position. According to exemplary embodiments, vehicle 26 can be balanced on wheels 18A and moved from location to location using assembly 10A in a substantially wheelbarrow type of fashion.

Figure 8:
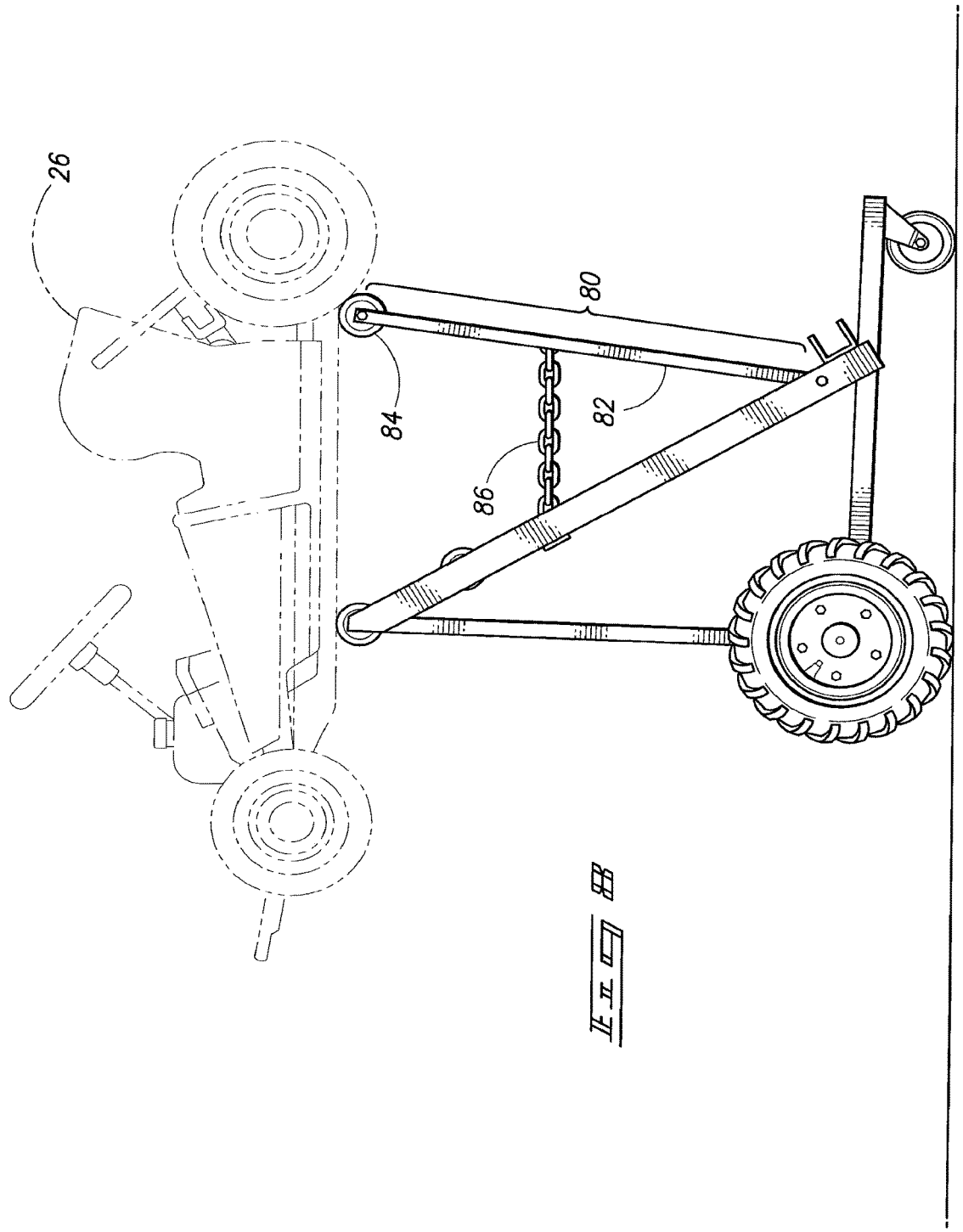
FIG. 8 is the assembly of FIG. 5, and a vehicle according to an embodiment.

Referring to FIG. 8 according to an exemplary implementation, assembly 10A can be equipped with a maintenance frame 80. Maintenance frame 80 can include members 82 and cross member 84. Members 82 and 84 can be configured to reside within support frame 21A when assembly 10A is configured to receive vehicle 26 in the loading position. According to exemplary embodiments, upon transition of vehicle 26 to the moving position, frame 80 may be extended while moving vehicle 26 to the maintenance position exemplarily depicted in FIG. 8. As an example, extending frame 80 can support vehicle 26 in a substantially horizontal position as well as allow for the movement of vehicle 26 using the wheels of frame 17A. According to exemplary embodiments, vehicle 26 may now be maintained at a level that allows the maintenance operator to access all or most portions of vehicle 26. While referred to as maintenance frame 80, and positioned in this maintenance position as shown in FIG. 8, the maintenance position may also be utilized to store vehicle 26. According to exemplary embodiments, cross member 84 may be a large rolling castor extending between members 82, allowing for the transition or the rolling transition of frame 80 to its maintenance position as shown in FIG. 8.

According to exemplary embodiments, frame 80 may be movably coupled to frame 21A allowing for the transition between loading position and maintenance position. Frame 21A can include a rest configured to receive frame 80 in the loading position. Frame 21A may also be coupled to frame 80 via a member 86. Member 86 can take the form of a length of chain for example. According to exemplary implementations, member 86 can be of sufficient length to align frame 80 at an angle other than normal to frame 17A. For example frame 80 can extend at an angle to the maintenance position that provides tension to member 86.

Frame 80 can be Movable between a first position substantially aligned with support frame 21A and a second position substantially aligned with loading frame 19A, for example. According to other example implementations frames 19A and 21A can extend at angles other than normal from frame 17A in one elevation. Frame 80 can be coupled to the support frame, for example. Both frames 80 and 21A can extend beyond frame 19a. The extended portions of frames 21A and 80 can be configured to engage the vehicle when frame 80 is in the second position.

Figure 9:
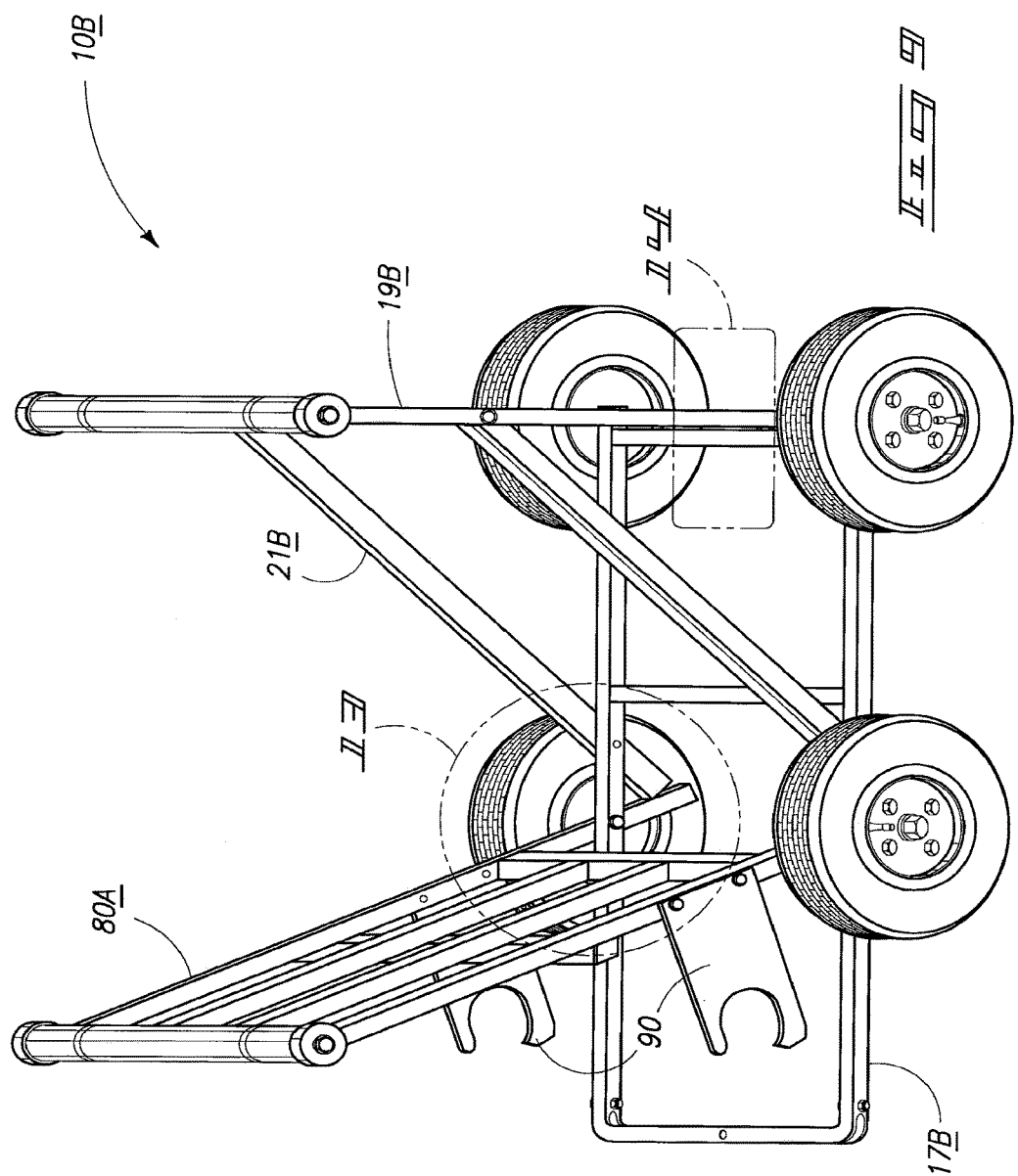
FIG. 9 is an assembly according to an embodiment.
Figure 10:
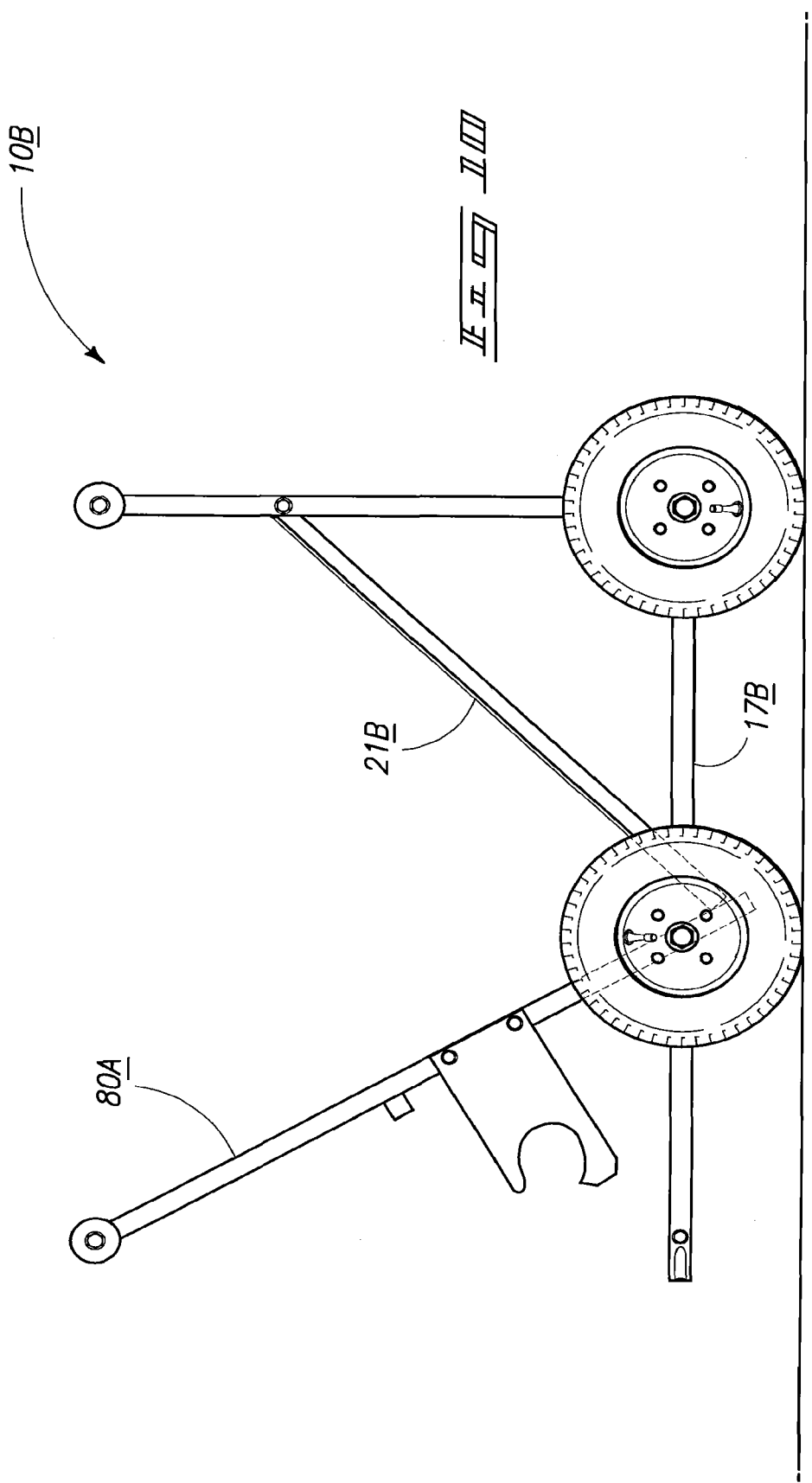
FIG. 10 is another view of the assembly of FIG. 9 according to an embodiment.
Figure 11:
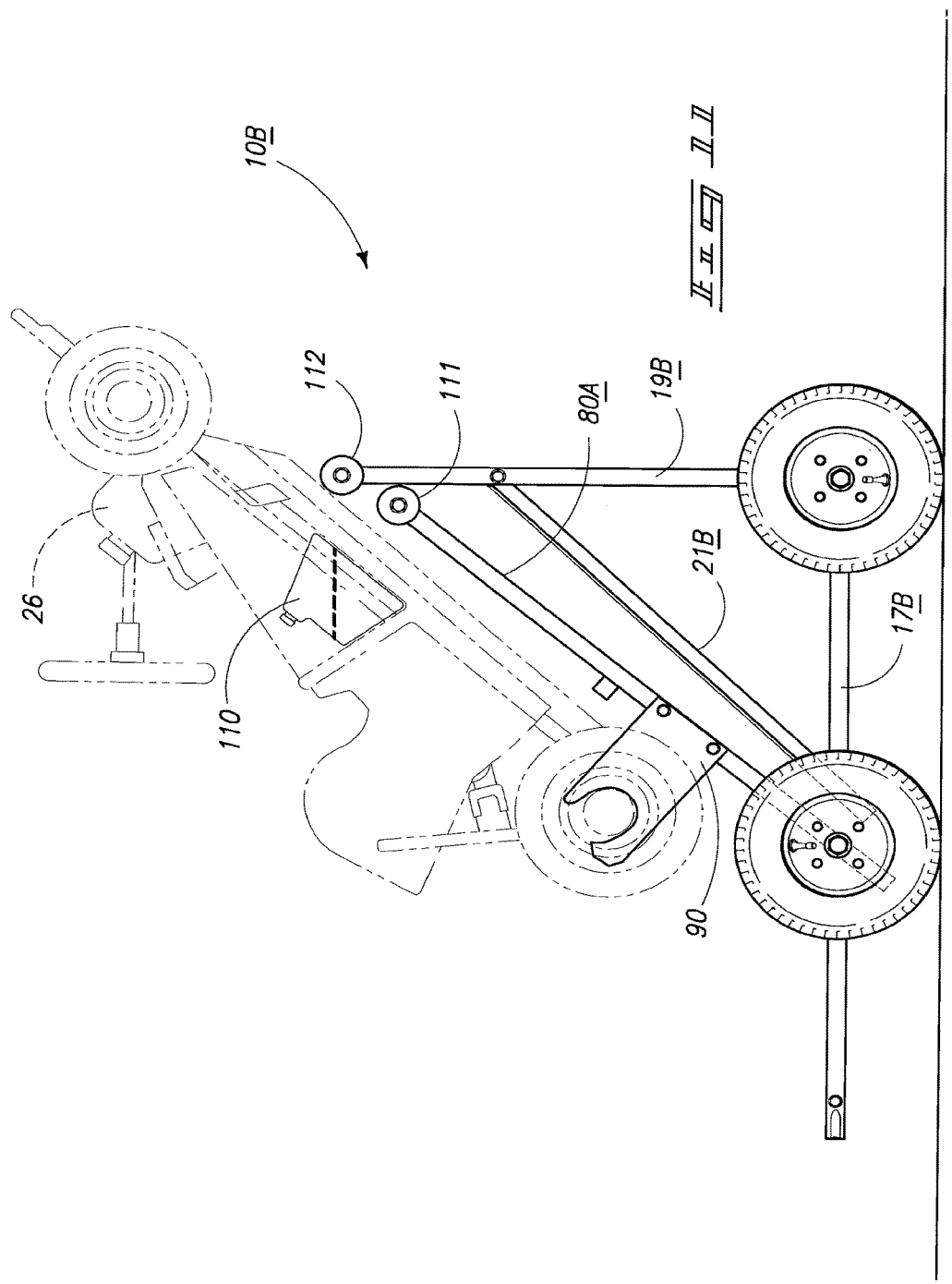
FIG. 11 is the assembly of FIG. 9, and a vehicle according to an embodiment.
Figure 17:
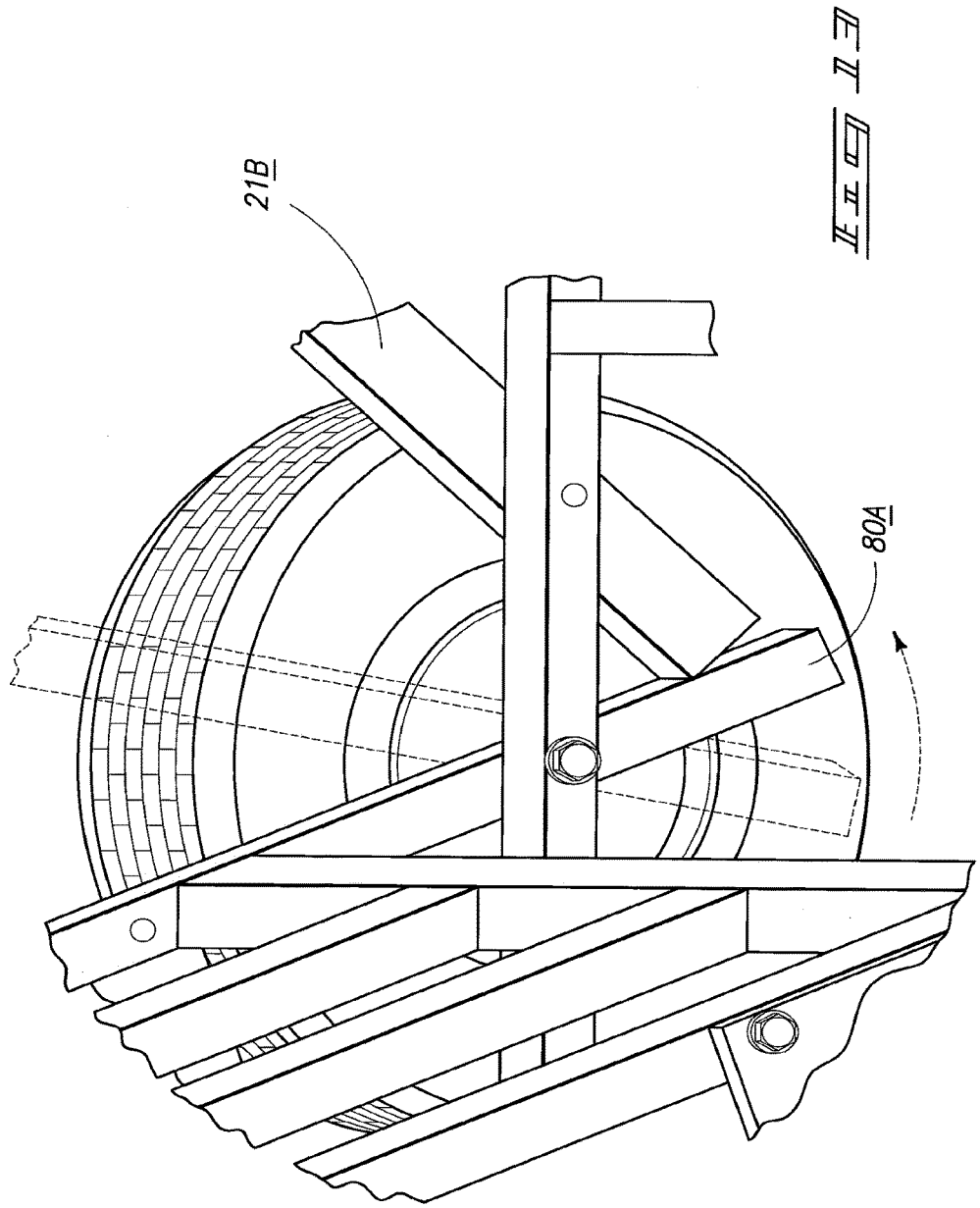

Referring to FIG. 9, assembly 10B is shown according to still another embodiment. Maintenance frame 80A can be movably coupled to moving frame 17B. Assembly 10B can include vehicle axle receiving assemblies 90, for example. Assemblies 90 can be coupled to frame BOA. Referring to FIG. 10, support frame 21B can extend beyond moving frame 17B. Maintenance frame 80A can also extend beyond moving frame 17B. When in the second position, frame 80A can engage frame 21B to hold frame 80A in relation to frame 21B, for example. Referring to FIG. 11, assembly 10B is shown in a second position, after loading of vehicle 26 onto members 90. As shown tank 110 can be partially filled with fuel to exemplify the importance of the storage angle of vehicle 26 in the second position. As shown, vehicle 26 is not so close to normal in relation to road surface that fuel can escape from tank 110.

Frame 80A can be configured to not engage support frame 21B. For example, when assembly 10B is in the loading or moving position for example frame 80A can be movably coupled to frame 17B and contact frame 19B. Frame 80A can include rollers 111 and these rollers can extend the width of frame 80A. Frame 19B can include rollers 112 as well. Rollers 111 and 112 can be aligned to receive a vehicle for transport, storage, and/or maintenance, see for example FIG. 16A. Rollers 111 and 112 can be aligned with frame 80A to provide ramp to receive the vehicle. Further, frame 19B and/or 80A may include a coupling device (not shown) that is configured to couple with vehicle 26. Coupling devices can include but are not limited to straps, clips, and/or snaps. According to example implementations, the coupling devices can prevent vehicle 26 from pivoting off of assembly 10B. Referring to FIG. 12, assembly 10B is shown in the second position with vehicle 26 supported for maintenance, if desired. Referring to FIG. 13, a more detailed view of frame 80A and support frame 21B is shown with frame 80A in the second position engaged with frame 21B and dashed lines representing frame 80A in the first position.

Figure 14:
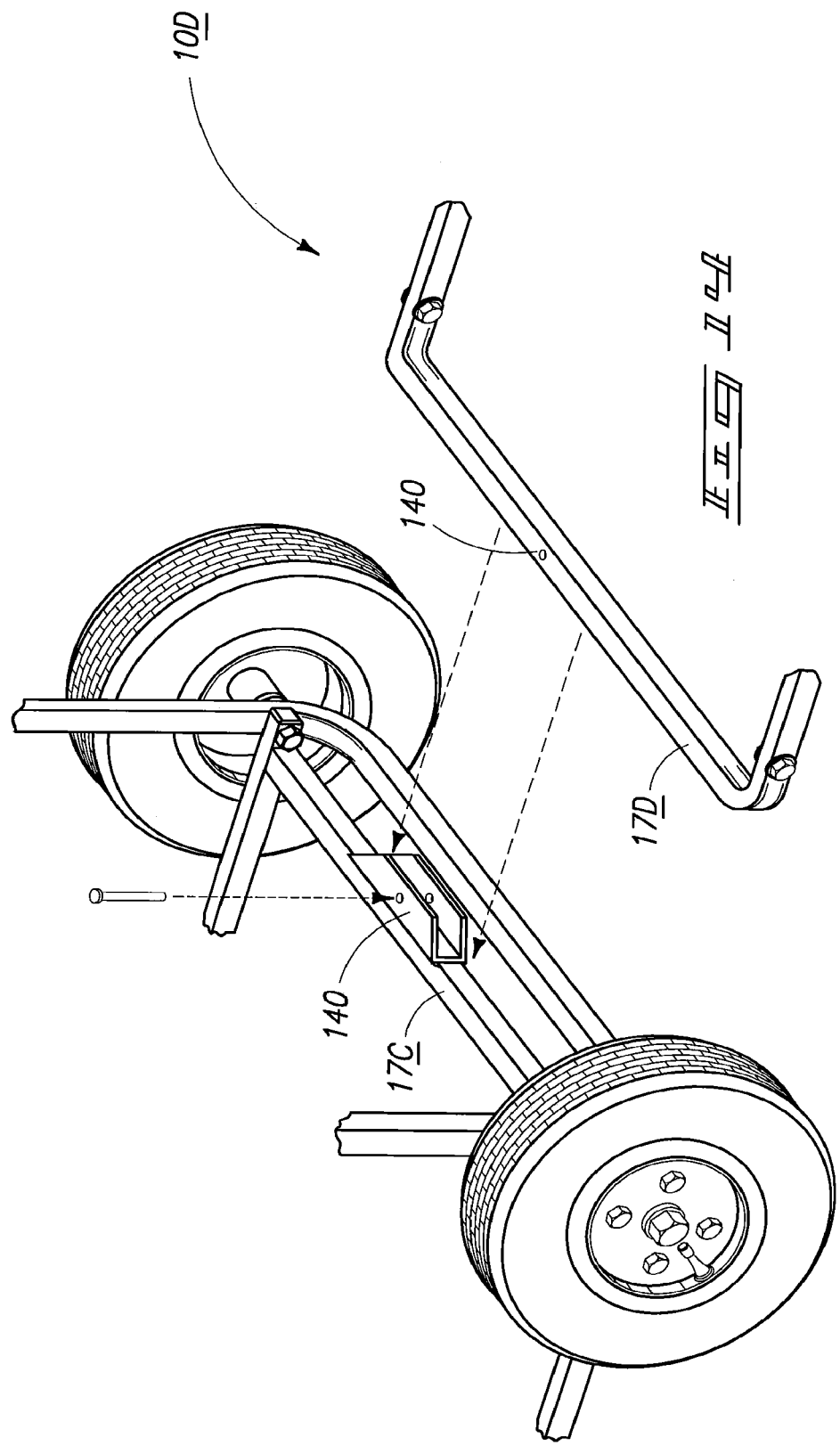
FIG. 14 is a detail of the assembly of FIG. 9 according to an embodiment.

Referring to FIG. 14, portions of assemblies 10C and 10D are shown having hitch apparatus 140. Apparatus 140 can include a first portion coupled to a first portion of moving frame 17C and a second portion coupled to a second portion of moving frame 17D, for example. In the same assembly the first and second portions can be at opposite portions of the moving frame. Apparatus 140 can be configured to pivotally engage. Referring to FIG. 15, multiple assemblies, 10C, 10D, and 10E can be coupled and moved simultaneously. As an example, the multiple assemblies can be moved in and out of a storage enclosure.

Referring to FIG. 16A-E assembly 10C is shown in multiple positions starring with position 16A, the loading position. In position 16A, vehicle 26 can be aligned with maintenance and support frames. In position 16B, vehicle 26 can be placed on the maintenance frame, and in position 16C, vehicle 26 can engage with the axle support members. Assembly 10C may be used to practically scoop vehicle 26 from its grounded position once wheels of vehicle 26 are supported. According to example implementations this can facilitate the transportation, storage, and/or maintenance of vehicle 26 without damaging either bumper portion of vehicle 26.

In positions 16B and 16C vehicle 26 can be supported substantially parallel to the road surface. Assembly 10C can then be pivoted to support vehicle 26 in a second position, as shown in FIG. 15, vehicle 26 can be supported substantially normal to the road surface. As shown in position 16E, the maintenance frame can be extended to support vehicle 26 in a position substantially parallel to the road surface.

The invention claimed is:

1. A go-kart transportation, storage, and maintenance assembly, the assembly comprising:
    a moving frame comprising opposing ends;
    a loading frame coupled to the moving frame;
    a support frame configured to support a go-kart and extend at an angle other than normal from the moving frame to the loading frame, the support frame coupling to the moving frame at a location on the moving frame between the opposing ends of the moving frame to define a portion of the moving frame that extends beyond the location;
    a maintenance frame pivotably coupled in relation to the support frame, the maintenance frame movable from a first position substantially aligned within the support frame and a second position substantially aligned with the loading frame; and
    go-kart axle flames coupled to the maintenance frame.

2. The assembly of claim 1 further comprising a roller defining an end of the maintenance frame.

3. The assembly of claim 1 wherein a roller defines an end of the loading frame.

4. The assembly of claim 1 further comprising a restraint coupling the maintenance frame and the support frame.

5. The assembly of claim 1 wherein the maintenance frame is pivotably coupled to the support frame.

6. The assembly of claim 1 further comprising a hitch apparatus.

7. The assembly of claim 6 wherein the hitch apparatus comprises a first portion coupled to a first portion of the moving frame and second portion coupled to a second portion of the moving frame, the first and second portions of the moving frame being at opposite portions of the moving frame.

8. The assembly of claim 1 further comprising pairs of wheels operatively engaged with the moving frame.

9. A go-kart transportation, storage, and maintenance assembly, the assembly comprising:
    a moving frame comprising opposing ends;
    a loading frame coupled to the moving frame;
    a support frame configured to support a go-kart and extend at an angle other than normal from the moving frame to the loading frame, the support frame coupling to the moving frame at a location on the moving frame between the opposing ends of the moving frame to define a portion of the moving frame that extends beyond the location; and
    a maintenance frame pivotably coupled in relation to the support frame, the maintenance frame movable from a first position substantially aligned within the support frame and a second position substantially aligned with the loading frame, wherein the maintenance frame is pivotably coupled to the moving frame and wherein the maintenance frame includes extensions that abut the support frame when in the second position.

* * * * *